(12) United States Patent
De La Prieta et al.

(10) Patent No.: US 6,410,081 B1
(45) Date of Patent: Jun. 25, 2002

(54) PASTE FOR WELDING CERAMICS TO METALS AND METHOD FOR PRODUCING A WELDED JOINT

(75) Inventors: Claudio De La Prieta, Stuttgart; Uwe Glanz, Asperg; Carmen Schmiedel, Marbach am Neckar; Petra Kitiratschky, Renningen; Bernhard Zappel, Unterensingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,404

(22) PCT Filed: Aug. 4, 1999

(86) PCT No.: PCT/DE99/02421

§ 371 (c)(1),
(2), (4) Date: Nov. 17, 2000

(87) PCT Pub. No.: WO00/15384

PCT Pub. Date: Mar. 23, 2000

(30) Foreign Application Priority Data

Sep. 16, 1998 (DE) .......................... 198 42276

(51) Int. Cl.⁷ .......................... B05D 5/12; B23K 31/02
(52) U.S. Cl. .......................... 427/96; 228/120
(58) Field of Search .................. 228/120, 121, 228/122.1; 427/96

(56) References Cited

U.S. PATENT DOCUMENTS

| | | | | |
|---|---|---|---|---|
| 3,306,717 A | * | 2/1967 | Lindstrand et al. ........... 29/197 |
| 3,929,491 A | * | 12/1975 | Smith et al. | |
| 4,037,773 A | * | 7/1977 | Record | |
| 4,040,822 A | * | 8/1977 | Stern ........................... 75/104 |
| 4,064,287 A | * | 12/1977 | Lipson et al. ................. 427/53 |
| 4,404,237 A | * | 9/1983 | Eichelberger et al. ........ 427/96 |
| 4,409,135 A | * | 10/1983 | Akimune et al. | |
| 4,595,605 A | * | 6/1986 | Martin et al. ................. 427/96 |
| 4,962,066 A | * | 10/1990 | Starz et al. ................... 501/19 |
| 5,121,298 A | * | 6/1992 | Sarma et al. ............... 361/406 |
| 5,122,339 A | * | 6/1992 | Pickens et al. ............. 420/533 |
| 5,202,153 A | * | 4/1993 | Siuta .......................... 427/125 |
| 5,326,390 A | * | 7/1994 | Tecle .......................... 106/208 |
| 5,470,607 A | * | 11/1995 | Odashima et al. ............ 427/96 |
| 5,547,530 A | * | 8/1996 | Nakamura et al. ............ 156/89 |
| 6,228,468 B1 | * | 5/2001 | Vodrahalli ................... 428/210 |

FOREIGN PATENT DOCUMENTS

| | | | |
|---|---|---|---|
| EP | 0 453 858 | * | 10/1991 |
| EP | 0 839 598 | * | 5/1998 |
| GB | 1017487 | * | 1/1966 |

* cited by examiner

*Primary Examiner*—Tom Dunn
*Assistant Examiner*—L. Edmondson
(74) *Attorney, Agent, or Firm*—Kenyon & Kenyon

(57) ABSTRACT

The invention proposes a paste for welding ceramic materials to metallic contact surfaces or metals, which contains a noble metal, an aluminum compound, a silicon compound, and a compound selected from the group of the barium compounds, calcium compounds, and magnesium compounds. Along with these, a binder, a solvent, a softener, a thixotropic agent, and a dispersing agent can also be added to the paste. A paste of this kind is used to produce a welded joint between ceramic materials and a metallic contact surface, the paste preferably being printed onto the ceramic material. The ceramic material is then sintered with the paste, and then the metallic contact surface or a metal is welded on.

22 Claims, No Drawings

PASTE FOR WELDING CERAMICS TO METALS AND METHOD FOR PRODUCING A WELDED JOINT

BACKGROUND OF THE INVENTION

The invention relates to a paste for welding ceramic materials to metallic contact surfaces or metals according to the species defined in the principal claim, as well as a method for producing a welded join between ceramic materials and metals using this paste.

It is commonly known that metallic connecting contacts can be implemented on ceramic substrates by way of bonding, welding, or soldering methods. The contacts and contacting methods known so far are not suitable for high mechanical and thermal stresses, however, since the adhesion between the connecting contact and ceramic substrate is often insufficient. Plug contacts have hitherto been used in such cases.

SUMMARY OF THE INVENTION

The object of the present invention is therefore to develop a paste, and a method that can be carried out therewith, for welding metallic contact surfaces or metals to ceramic materials, in which context the paste withstands high thermal and mechanical stresses so as thereby to avoid the use of cost-intensive standard plug contacts.

ADVANTAGES OF THE INVENTION

The paste according to the present invention having the characterizing features of the principal claim, and the method carried out therewith for welding metallic contact surfaces to ceramic materials, has the advantage, as compared to the existing art, of making possible direct welding of metallic contact surfaces, for example lead frame materials, to ceramic standard materials via an intermediate layer made of the paste; the weld, while having good electrical properties, at the same time withstands high thermal and mechanical stresses, so that plug contacts hitherto used can be omitted. A considerable reduction in the cost of manufacture is thus also achieved.

The paste according to the present invention thus makes possible in simple fashion, for example, electrical contacting to sensor elements using welding methods, in which context metallic materials are welded onto standard substrates and the paste according to the present invention acts as an adhesion layer. The temperature resistance of the welded join is guaranteed up to at least 500° C.

Advantageous developments of the invention are evident from the features recited in the dependent claims.

DETAILED DESCRIPTION OF THE INVENTION

As a result of further added paste components such as a binder, a softener, a solvent, a dispersing agent, and a thixotropic agent, it is possible in particular to influence the processability of the paste according to the present invention very advantageously in terms of viscosity and handling, so that it is also suitable, for example, as a printing paste or for application by way of a ductor, and can thus easily be integrated in terms of process engineering into existing production techniques.

It is also advantageous if, prior to the sintering of the ceramic material and paste, a platinum conductive paste is additionally printed onto the paste that has been applied onto the ceramic material and, in particular, dried. The electrical conductivity of the welded join can thereby be improved, in particular if the paste according to the present invention contains low concentrations of noble metal.

EXEMPLARY EMBODIMENTS

The paste according to the present invention contains at least one noble metal, at least one aluminum compound, at least one silicon compound, and at least one compound selected from the group of the barium compounds, magnesium compounds, and calcium compounds.

Moreover, in an advantageous development of the invention, a binder, a softener, and a solvent are additionally added for simplified handling and production of the paste. In addition, if necessary, a thixotropic agent and a dispersing agent are incorporated into the paste if necessary. Platinum, palladium, silver, or gold is especially suitable as the noble metal.

Suitable barium compounds are, in particular, barium oxide, barium carbonate, barium hydrate, barium acetate, or another organic barium compound; it is very advantageous if the barium compound, during subsequent drying and/or sintering of the paste according to the present invention together with the ceramic material and the metallic contact surface, decomposes or is converted into barium oxide as completely and with as few residues as possible. Also particularly advantageous is the addition of barium oxide as the barium compound to the paste according to the present invention, since, for example, vigorous gas evolution or the release of water is disadvantageous in the context of welding.

The barium compound in the paste according to the present invention can be entirely or partially replaced by a magnesium compound and/or a calcium compound; MgO, CaO, $MgCO_3$, $CaCO_3$, the hydroxides of calcium or magnesium, and organic magnesium or calcium compounds are particularly suitable for this purpose, since after drying and/or sintering they very advantageously, similarly to the requirements for the barium compound, are present at least largely as corresponding metal oxides.

Silicon dioxide, an organic silicon compound, or a silicon-oxygen compound is suitable as the silicon compound; it is again very advantageous if the silicon compound, during subsequent drying or sintering of the paste according to the present invention together with the ceramic material and the metallic contact surface, decomposes or is converted into silicon dioxide as completely and with as few residues as possible. The addition of silicon dioxide, kaolin, kaolinite, or $Mg_2(SiO_4)$ (forsterite) as the silicon compound is particularly preferred.

Aluminum oxide ($Al_2O_3$), an organic aluminum compound such as aluminum formate, or aluminum hydroxide ($Al(OH)_3$ or $AlO(OH)$) is suitable as the aluminum compound; here again, as in the case of silicon and barium, it is very advantageous if the aluminum compound, during subsequent drying or sintering of the paste according to the present invention together with the ceramic material and the metallic contact surface, decomposes or is converted into aluminum oxide ($Al_2O_3$) as completely and with as few residues as possible. Direct addition of aluminum oxide ($Al_2O_3$) as the aluminum compound is particularly preferred.

A paste using platinum, silicon dioxide, aluminum dioxide, and barium oxide has proven to be very particularly preferred in terms of adhesion, economy, and simple handling.

Possible compositions of the paste according to the present invention are reproduced in Examples 1 through 3 of embodiments. The use of the relatively small quantities of barium compound, such as barium oxide or barium carbonate (which can be entirely or partially replaced by a calcium or magnesium compound), and of the silicon compound such as silicon dioxide, has proven to be an essential feature of the invention that is claimed.

EXAMPLE 1

60.8 wt % platinum
16.7 wt % aluminum oxide
0.4 wt % silicon dioxide
1.6 wt % barium oxide;
the following are additionally added:
    4.0 wt % polyvinyl butyral as binder
    1.4 wt % dibutyl phthalate as softener
    15.1 wt % Butyl Carbitol as solvent.

EXAMPLE 2

60.7 wt % platinum
15.2 wt % aluminum oxide
0.5 wt % silicon dioxide
0.9 wt % barium oxide
the following are additionally added:
    4.3 wt % polyvinyl butyral as binder
    1.6 wt % dioctyl phthalate as softener
    16.8 wt % Butyl Carbitol as solvent.

EXAMPLE 3

38.2 wt % platinum
39.7 wt % aluminum oxide
1.2 wt % silicon dioxide
0.4 wt % barium oxide
the following are additionally added:
    4.0 wt % polyvinyl butyral as binder
    1.4 wt % dibutyl phthalate as softener
    15.1 wt % Butyl Carbitol as solvent.

Depending on the solvent, many wetting and dispersing agents known per se are suitable as dispersing agents for addition to the pastes described in Examples 1 through 3. In particular, the use of products under the trade names Diperplast or Disperbyk of BYK-Chemie GmbH, D-46462 Wesel, Germany, which can be added as necessary at a concentration of 0.2 to 6 wt %, has proven advantageous. Polyvinyl butyral or ethyl cellulose, for example, is suitable as the thixotropic agent for addition to the pastes described in Examples 1 through 3. It can be added at a quantity of 0.5 to 25 wt %.

The noble metals and the aluminum or silicon compound or the compound from the group of the barium compounds, calcium compounds, or magnesium compounds are advantageously used in the form of very finely ground powders whose particle sizes lie in the range from 0.1 $\mu$m to 50 $\mu$m.

The specific surface of the noble metal powders is advantageously between 1 and 10 m$^2$/g, and that of the aluminum compound powder is advantageously between 5 and 15 m$^2$/g. A platinum powder having a specific surface of approx. 3 m$^2$/g and an aluminum oxide ($Al_2O_3$) powder having a specific surface of approx. 10 m$^2$/g are particularly preferred.

All the components of the paste are mixed in a manner known per se, and processed into a homogeneous mass. This is then applied, in particular by spreading, printing, or brushing, onto the ceramic material that is to be welded to the metallic contact surface, and is dried if necessary.

The metallic contact surface, for example in the form of a lead frame or a thin foil, is then applied onto the dried paste and is sintered at approximately 1500–1550° C., in a co-firing process, together with the ceramic material and the dried paste. A metallic contact can then be welded in a manner known per se onto the metallic contact surface, the paste on the one hand acting as an adhesion promoter between the metal contact surface and ceramic material, and on the other hand serving at least locally as an electrically conductive intermediate layer.

Alternatively, after the paste, processed into a homogeneous mass, has been applied onto the ceramic material and dried, sintering of the ceramic material with the paste present thereon can also first be performed, this sintering being accomplished, as above, using the co-firing method at approximately 1500–1550° C. Then the metallic contact surface, for example in the form of a lead frame or a thin metal foil, is applied onto the paste sintered to the ceramic material, and is welded in a manner known per se so as to create a metallic contact, the paste on the one hand serving as an adhesion promoter between the metallic contact surface and ceramic material, and on the other hand serving at least locally as an electrically conductive intermediate layer between the metal and the ceramic material welded thereto.

In a development of the two methods described above, it is moreover possible for a further platinum conductive paste, known per se, first to be applied, before sintering and welding, onto the dried paste applied onto the ceramic material. Both pastes are then preferably dried again before being processed further in the two variant methods described above.

The modified methods using the platinum conductive paste have the advantage that the paste according to the present invention can be processed with a lower concentration of noble metal without losing the electrical conductivity between the welded-on metal and the ceramic material. The platinum conductive paste thus serves to form an electrically conductive layer.

A substrate made of aluminum oxide, silicon carbide, or zirconium dioxide is especially suitable as the ceramic material.

What is claimed is:

1. A paste for welding ceramic materials to metallic contact surfaces or metals, comprising a paste including at least one noble metal, at least one aluminum compound, at least one silicon compound, and at least one compound selected from the group consisting of barium compounds, calcium compounds, and magnesium compounds, wherein the paste contains 5 to 60 wt % of an aluminum compound, 0.2 to 5 wt % of a silicon compound, 0.2 to 5 wt % of a compound selected from the group consisting of barium compounds, calcium compounds, and magnesium compounds, and 20 to 80 wt % noble metal.

2. The paste as defined in claim 1, further including a polyvinyl butyral binder.

3. The paste as defined in claim 1, further including a dibutyl phthalate or dioctyl phthalate softener, or a Butyl Carbitol solvent.

4. The paste as defined in claim 1, further including a polyvinyl butyral or ethyl cellulose dispersing agent or thixotropic agent.

5. The paste as defined in claim 4, wherein the dispersing agent is present at a concentration of 0.2 to 6 wt % and the thixotropic agent is present at a concentration of 0.5 to 25 wt %.

6. The paste as defined in claim 3, wherein the solvent is present at a concentration of 9 to 30 wt %.

7. The paste as defined in claim 3, wherein the softener is present at a concentration of 0.3 to 5 wt %.

8. The paste as defined in claim 1, wherein the paste contains 1 to 10 wt % binder.

9. The paste as defined in claim 1, wherein the noble metal, the aluminum compound, the silicon compound, and the compound selected from the group consisting of barium compounds, calcium compounds, and magnesium compounds are introduced as very finely ground powder, having a particle size of 0.1 $\mu$m to 50 $\mu$m.

10. A paste for welding ceramic materials to metallic contact surfaces or metals, comprising a paste including at least one noble metal, at least one aluminum compound, at least one silicon compound, and at least one compound selected from the group consisting of barium compounds, calcium compounds, and magnesium compounds, wherein the noble metal, the aluminum compound, the silicon compound, and the compound selected from the group consisting of barium compounds, calcium compounds, and magnesium compounds are introduced as very finely ground powder, having a particle size of 0.1 $\mu$m to 50 $\mu$m, and wherein the specific surface of the powder of the silicon compound is between 5 and 15 $m^2/g$, and the specific surface of the noble metal powder is between 1 and 10 $m^2/g$.

11. The paste as defined in claim 1, wherein the noble metal is platinum.

12. The paste as defined in claim 1, wherein the barium compound is a barium oxide, barium carbonate, barium acetate, barium hydroxide, or an organic barium compound.

13. The paste as defined in claim 1, wherein the calcium compound is a calcium oxide, calcium carbonate, calcium hydroxide, or an organic calcium compound.

14. The paste as defined in claim 1, wherein the magnesium compound is a magnesium oxide, magnesium carbonate, magnesium hydroxide, or an organic magnesium compound.

15. The paste as defined in claim 1, wherein the aluminum compound is $Al_2O_3$, $Al(OH)_3$, AlOOH, or an organic aluminum compound.

16. The paste as defined in claim 1, wherein the silicon compound is silicon dioxide, kaolin, kaolinite, $Mg_2(SiO_4)$, an organic silicon compound, or a silicon-oxygen compound.

17. A method for producing a welded join between ceramic materials and metals or metallic contact surfaces, comprising the steps of applying the paste according to claim 1 onto a ceramic material and sintering the ceramic material with the paste, wherein sintering is performed at a temperature of 1450° C. to 1600° C., and wherein, after sintering, a metallic contact surface, a metal foil, or a metal is welded onto the ceramic material equipped with the paste.

18. The method as defined in claim 17, wherein the paste is dried after application.

19. The method as defined in claim 17, wherein the paste is printed onto the ceramic material.

20. The method as defined in claim 17, further comprising the step of printing a platinum conductive paste at least locally onto the paste after the paste has been applied.

21. The method as defined in claim 20, further comprising the steps of drying and sintering the ceramic material equipped with the paste and the platinum conductive paste.

22. The method as defined in claim 21, wherein after sintering, a metallic contact surface, a metal foil, or a metal is welded onto the ceramic material equipped with the paste and the platinum conductive paste.

* * * * *